INVENTOR.
CHARLES J. LEONHART
BY Mason, Kolehmainen,
Rathburn & Wyss.

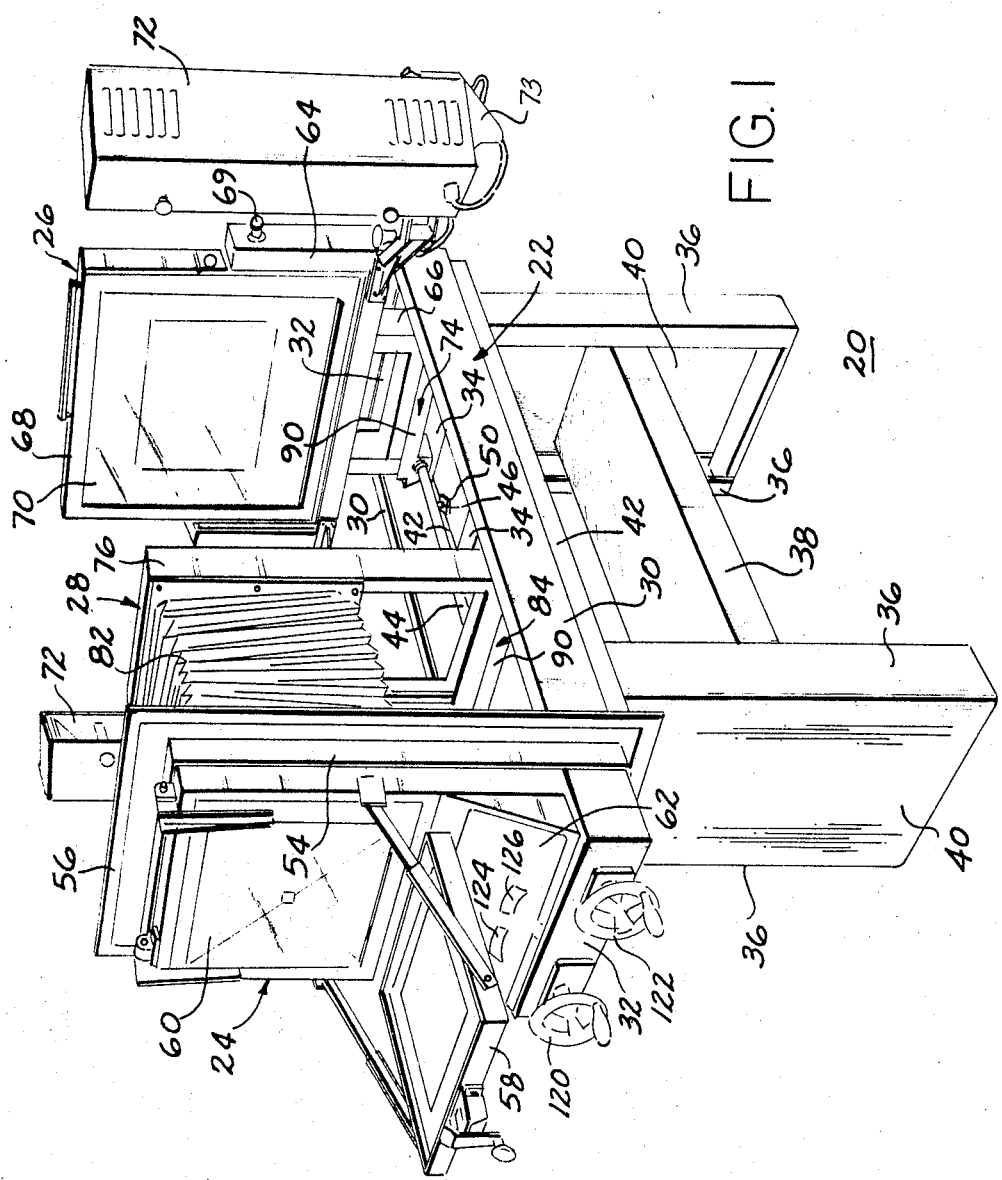

ATTORNEYS

Jan. 28, 1969  C. J. LEONHART  3,424,530
PHOTOGRAPHIC MACHINE
Filed Oct. 22, 1965

INVENTOR.
CHARLES J. LEONHART
BY Mason, Kolehmainen,
Rathburn & Wyss
ATTORNEYS

United States Patent Office 3,424,530
Patented Jan. 28, 1969

3,424,530
PHOTOGRAPHIC MACHINE
Charles J. Leonhart, Carol Stream, Ill., assignor to The Nuarc Company, Chicago, Ill., a corporation of Illinois
Filed Oct. 22, 1965, Ser. No. 500,791
U.S. Cl. 355—61    6 Claims
Int. Cl. G03b 21/00, 27/32

ABSTRACT OF THE DISCLOSURE

A photographic machine includes a horizontal supporting bed having several crosspieces and an upstanding film holder at one end of the bed. A pair of horizontal parallel shafts are supported over the bed by adjustment bolts carried by the crosspieces. A lens and a copy holder are supported on upstanding frames, each carried by a carriage member slidable along the shafts. Each carriage member includes four ball bushings, two slidable on each shaft, formed of a generally cylindrical body and ball bearings rollable between the shaft and the body. The bodies are slotted to permit the ball bushings to move past the adjustment bolts, and rotatable threaded shafts engage the carriage members for adjustment of the lens and copy holder.

The present invention relates to photographic machines, and more particularly to an improved horizontal camera for producing photographic copies of graphic originals.

In many commercial photographic operations when it is desired to obtain high quality photographic reproductions of graphic originals, and particularly when originals and film of large size are used, so-called horizontal cameras are useful. Such cameras include a horizontally positioned supporting structure and include means at one end of the camera for holding film to be exposed in a generally vertical plane. Copy holding means for holding an item to be copied are movably mounted on the supporting structure, and movement of the item to be copied toward and away from the film produces reduction or enlargements in the size, as desired. Furthermore, a lens is movably supported between the film and copied item to focus a light image on the film, the position of optimum focusing varying with the distance between the film and copied item.

When large reproductions are desired and when large graphic original items are copied, horizontal cameras are particularly useful because the distance between the film and item can be increased without greatly decreasing the convenience of operation of the camera. With vertical cameras, or with rotating cameras, such as that disclosed in the copending application of Charles J. Leonhart, Ser. No. 479,712 filed Aug. 16, 1965, large film-to-item distances cannot be conveniently obtained. Horizontal cameras can be made any desired length, and are frequently installed passing through a wall so that the film holding portion and the camera controls are located in a dark room while the rest of the camera structure extends through the wall and into an adjacent room.

In any photographic process, and particularly when items of a graphic nature are photographed, it is desired to reduce distortion to a minimum. In horizontal cameras, one cause of distortion may be lack of rigidity and strength in the structure supporting the lens, film and copied item. To overcome this source of distortion, horizontal cameras are frequently very heavy and bulky. However, this solution has been unsatisfactory both because of the expense of manufacturing such cameras and because of the great inconvenience in moving and installing large heavy cameras.

Distortion also results when the film, lens and copied item are not held precisely parallel to one another. Since the adjustable portions of a horizontal camera move back and forth over the supporting structure, this structure must be aligned with great care to hold the movable lens and copied item parallel to the film in all positions. Past horizontal cameras, even if carefully aligned when installed, often come out of alignment after a period of use, thus introducing distortion.

The mechanisms for adjusting and supporting the lens and the item to be copied are frequently a major source of distortion. If the lens and copied item are mounted so that they are difficult to move, a large force is necessary to adjust them, and distortion is difficult to avoid because of the large strain on the structure of the camera during use. Furthermore, the movable portions of the camera should be supported in a firm, stable fashion in order to hold the film, lens and copied item parallel at all times.

Accordingly, it is an object of the present invention to provide an improved photographic machine.

It is another object of the present invention to provide a horizontal camera having a lightweight but firm and strong supporting structure.

Another object of the present invention is to provide a photographic machine including improved supporting means for supporting the movable parts of a horizontal camera and including ground hardened steel shafts supported over a simple supporting bed.

It is still another object of the present invention to provide a photographic machine including novel means for adjusting and leveling portions of the supporting structure.

It is yet another object of the present invention to provide an improved adjustable horizontal camera including means for easily adjusting the positions of parts of the camera while maintaining high reproduction quality.

It is another object of the present invention to provide a horizontal camera including novel means for mounting the movable portions of the camera for easily induced gliding motion along the supporting structure of the camera.

Another object of the present invention is to provide a photographic machine including means for supporting movable portions of the camera in a vertical plane by four point support of each movable camera portion.

In brief, a photographic machine constructed in accordance with the present invention may comprise a supporting bed mounted at a convenient height and forming a firm horizontal support for the camera structure. The bed consists of a lightweight but strong latticework or framework having great rigidity. A film holding assembly mounted in a fixed position near one end of the bed serves to hold the film to be exposed in the machine. A copy holding assembly for holding an item to be copied is mounted on the bed for movement toward and away from the film so that the size of the copy to be reproduced may be changed by movement of the copy holding assembly. A lens assembly is movably mounted between the film and the item to be copied, and focusing is accomplished through movement of the lens assembly.

To allow movement of the copy holding and lens assemblies while holding them precisely parallel with the film, and in accordance with an important feature of the present invention, the lens and copy board and copy holding assemblies are mounted upon carriages including bushings slidably engaged with a pair of shafts extending along the length of the supporting bed. Extremely stable four point support of the lens and the copied item is accomplished by providing each carriage with two bushings engaging each shaft, and in order to allow the carriages to be easily moved and precisely positioned along the shaft with the use of only a small force, bushings of the ball bushing type are used.

In accordance with another important feature of the present invention, each shaft is supported at several points along its length above the bed by adjusting and leveling bolts interconnecting the shaft with the supporting bed. To allow the carriages to slide past the leveling bolts, the ball bushings are slotted along their length to permit passage of the bushings past the bolts.

Since the photographic machine may be installed passing through a wall with only the film holding end of the camera located in a dark room, the machine includes drive screws for moving the carriages from the end of the bed, and indicators are provided for indicating the positions of the carriages to an operator located in the dark room.

Further objects and advantages of the present invention will become apparent as the following description proceeds and the features of novelty which characterize the invention will be pointed out with particularity in the claims annexed to and forming a part of the specification.

For a better understanding of the present invention, reference may be had to the accompanying drawings in which:

FIG. 1 is a perspective view of a photographic machine constructed in accordance with the present invention.

Figure 3:
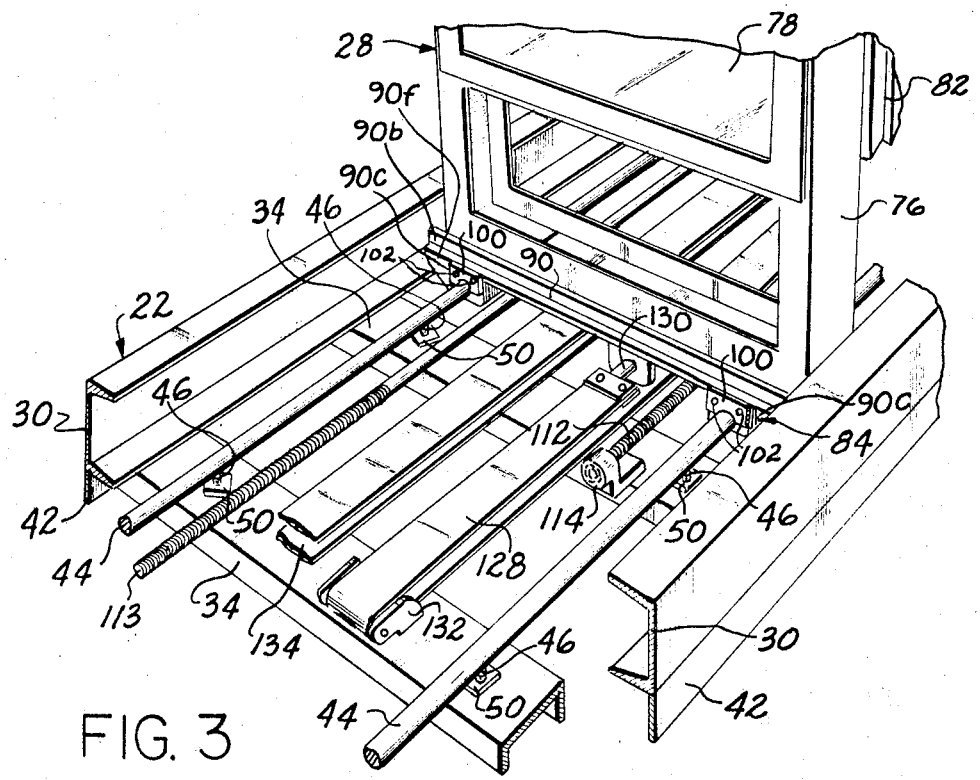
FIG. 3 is an enlarged fragmentary perspective view illustrating a portion of the supporting bed and lens holding apparatus of the machine of FIG. 1.

Referring now to the drawings there is illustrated a photographic machine generally designated as 20 and comprising a horizontal camera constructed in accordance with the present invention. The machine 20 includes a supporting bed indicated at 22 arranged in a horizontal plane and supported at a convenient height. A film holding assembly, generally designated at 24, is mounted in a fixed position at one end of the bed 22 and serves to hold the film to be exposed in the camera in a generally vertical plane above the bed 22. A copy holding assembly designated as 26 is mounted for movement back and forth toward and away from the film holding assembly 24 on the supporting bed 22, whereby the size of copies produced may be enlarged or reduced as desired. Between the film holding assembly 24 and the copy holding assembly 26 a lens mounting assembly generally designated as 28 is mounted for movement back and forth along the supporting bed 22 for focusing on the film a light image reflected from an item to be copied held in the copy holding assembly 26.

The supporting bed 22 forms a lightweight but very strong and rigid support for the camera structure and includes a pair of elongated spaced side rails 30 joined at the ends by end rails 32 to form a long rectangular bed. For further support, a series of cross rails 34 are spaced along the bed 22 and fastened to the underside of the side rails 30. To achieve strength and rigidity without heavy weight, the side rails 30, and rails 32 and cross rails 34 are formed of cast aluminum and are channel-shaped in construction. Furthermore, these rails are fastened together by welding to form a unitary rigid structure. Thus, when the bed 22 is supported in a horizontal plane, it can be seen that a very firm support is provided for the structure of the photographic machine 20.

Sturdy support legs 36 are provided for holding the bed 22 at a convenient height. The legs 36 are interconnected by means of a shelf plate 38, and a screening plate 40 is connected between the legs 36 at each end of the camera in order to add aditional strength and to provide a stream-lined appearance. Preferably the bed 22 is bolted onto the supporting legs 36 whereby the horizontal camera may be shipped or moved in partially disassembled condition. To maintain the streamlined appearance and to mask the ends of the cross rails 34 at the sides of the horizontal camera, a pair of valance plates 42 are welded at the bottom of the side rails 30.

Figure 9:
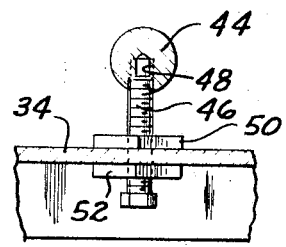
FIG. 9 is a greatly enlarged fragmentary sectional view taken along the line 9—9 of FIG. 2 and illustrating one of the shaft leveling and adjusting bolts.

In accordance with the present invention, the supporting bed 22 includes novel means for supporting the movable parts of the camera, i.e., the copy holding assembly 26 and the lens mounting assembly 28. This novel construction includes a pair of precision ground hardened steel support shafts 44 extending along the bed 22 parallel with the side rails 30. The entire weight of the copy holding assembly 26 and lens mounting assembly 28 is carried on these shafts 44, and the shafts are adjustably mounted over the bed 22 by means of a series of adjusting and leveling bolts 46. As best appears in FIG. 2, each shaft 44 is supported by one of the bolts 46 at each of the cross rails 34. Thus, in the illustrated embodiment of the invention, six cross rails 34 are used, and thus the shafts 44 are each supported at six spaced points. As clearly illustrated in FIG. 9, each bolt 46 extends upwardly through an opening in the corresponding cross rail 34 and is threaded into an internally threaded opening 48 provided in the shaft 44. To allow the shaft to be adjusted, a pair of nuts 50 and 52 threaded onto each bolt 46 engage the cross rail 34. Thus it can be seen that during installation or thereafter whenever necessary, the shafts 44 may be adjusted and leveled to provide a carefully aligned and perfectly level support for the copy holding assembly 26 and the lens mounting assembly 28.

Figure 2:
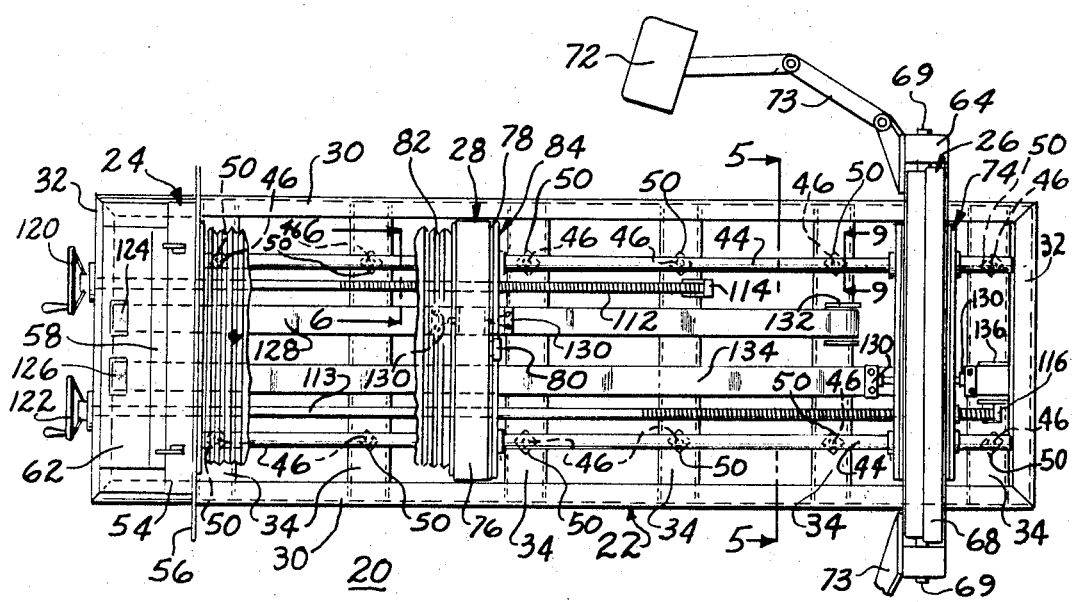
FIG. 2 is a top plan view of the machine of FIG. 1 with some of the structure broken away more clearly to illustrate the construction of the machine.

In order to support the film holding assembly 24 in a fixed position with respect to the bed 22, a generally rectangular vertically disposed support frame 54 is fastened between the side rails 30 near one end of the bed 22. The photographic machine 20 may be installed passing through a wall, with the film holding assembly 24 located in a dark room. In this case, the wall is provided with a rectangular opening corresponding in size generally to the support frame 54, and a wall plate 56 is provided adjacent the frame 54 for engaging the wall adjacent such an opening. Thus the plate 56 serves to exclude light which might otherwise pass through the opening into the dark room. The film holding assembly 54 includes a hinged film holding cover 58 for supporting film to be exposed in a vertical plane at the rear of the support frame 54. Illustrated in FIG. 1 but broken away in FIG. 2 is a hinged focusing plate 60 comprising a ground glass which may be pivoted out of the way when it is desired to expose a film. Beneath the hinged cover 58 and extending downwardly to the supporting bed 22 is a control panel 62, also serving to exclude light from a dark room. During operation of the camera, the control panel 62 as well as the lens mounting assembly 28 will be conveniently accessible to a camera operator located in the dark room.

The copy holding assembly 26 is located for movement along the bed 22 and includes a large U-shaped support 64 mounted above a smaller U-shaped mounting frame 66. The frame 66 is of narrow width in order that it may fit between the side rails 30 of the bed 22. A copyboard 68 is mounted between the upwardly extending legs of the support 64 on hinge pins 69. The copyboard 68 is pivotable between the illustrated position wherein a copy mounted in the copyboard 68 faces a film mounted in the film holding assembly 24 and a loading position wherein the copyboard is in a horizontal plane. Spring latches serve to lock the copyboard in the illustrated position when it is desired to make a copy. A transparent cover 70 is hinged to the copyboard 68 in order to hold an item to be copied in position facing the film, and in order to illuminate a copied item mounted in the copyboard 68, a pair of lighting units 72 are mounted forwardly and to either side of the support 64, by means of adjustable assemblies 73. As will be described in more detail hereinafter, the U-shaped mounting frame 66 is connected to a copy carriage 74 which is mounted for sliding back and forth movement upon the two shafts 44.

Having reference now to the lens mounting assembly 28, the assembly 28 includes a rectangular vertically disposed supporting frame 76 having a width such that the frame 76 fits between the side rails 30 of the supporting bed 22. A lens board 78 (FIG. 3) is mounted to the frame 76 and supports at the center thereof a camera lens 80 for focusing a light image reflected from an item to be copied mounted in holding assembly 26 onto film mounted in the film holding assembly 24. A collapsible bellows 82 extends between the lens assembly supporting frame 76 and the film holding assembly supporting frame 54 in order to exclude incident light from the film. The rectangular supporting frame 76 is connected to a lens carriage 84 mounted in a manner to be described for sliding movement back and forth along the supporting shafts 44.

Proceeding now to a description of the copy carriage 74 and the lens carriage 84, these carriages are identical in construction and only the lens carriage is herein described in detail. It should be understood that in the drawings identical reference numerals are used for identical portions of both carriages 74 and 84.

Figure 4:
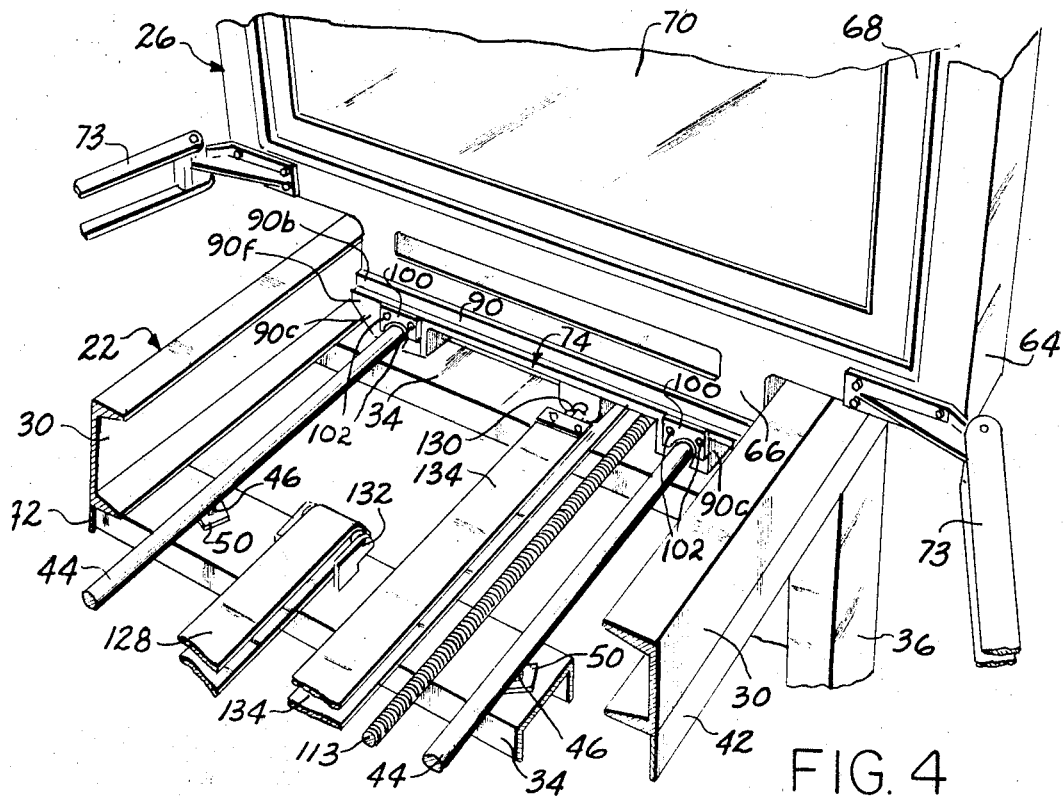
FIG. 4 is an enlarged fragmentary perspective view illustrating a portion of the supporting bed and copy holding apparatus of the machine of FIG. 1.
Figure 6:
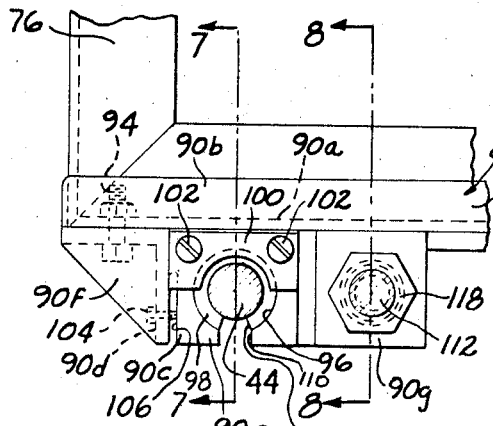
FIG. 6 is a greatly enlarged fragmentary sectional view taken along the line 6—6 of FIG. 2 illustrating a portion of the lens carriage.
Figure 7:
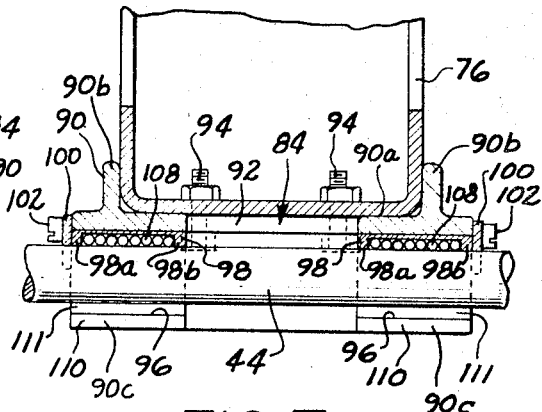
FIG. 7 is a sectional view taken along the line 7—7 of FIG. 6.
Figure 8:
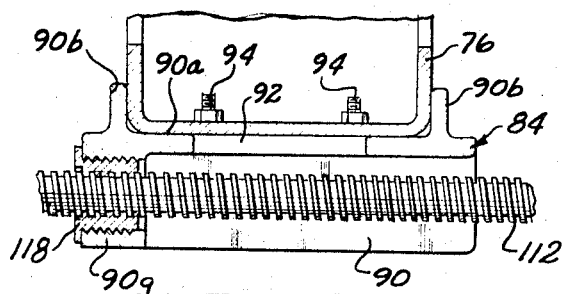
FIG. 8 is a sectional view taken along the line 8—8 of FIG. 6.

Each carriage 74 and 84 includes a unitary metal member 90 which may be a unitary casting or alternatively may consist of a welded assembly. Having reference to the member 90 of the lens carriage 84, as best illustrated in FIGS. 6, 7 and 8, a generally planar upper surface 90a is defined at the top of the member 90 for supporting the rectangular supporting frame 76 and the lens mounting assembly 28. A similar surface is provided on the carriage 74 for supporting the mounting frame 66 of the copy holding assembly 26. This surface 90a is provided with openings such as the opening 92 (visible in FIGS. 7 and 8) to reduce the weight of the member 90. Extending upwardly from the surface 90a are a pair of spaced positioning flanges 90b for snugly receiving the frames 66 and 76, which are bolted in place by means of four fasteners 94, a pair being located at each end of the member 90. At the bottom of the member 90 are located four mounting bosses 90c. These bosses 90c are located near the four corners of the member 90, but are slightly spaced from the two ends of the member 90. Thus, as clearly appears in FIGS. 3 and 4, the bosses 90c are aligned with the shafts 44, one pair for each shaft. Furthermore, each boss 90c defines a right cylindrical opening 96 (FIGS. 6 and 7) extending therethrough and arranged concentrically with the corresponding shaft 44 when the carriage is installed.

In accordance with a feature of the present invention, each of the carriages 74 and 84 is provided with four ball bushings 98 mounted in the bosses 90c. The bushings 98 are of generally cylindrical shape (FIG. 10) and are snugly received within the openings 96. The bushings 98 are held within the openings 96 by end caps 100 held in place by screws 102. Furthermore, each bushing is held from rotation within the corresponding opening 96 by tensioning means including a set screw 104 threaded through an opening in a wall 90d of the member 90 (FIG. 6). Between the wall 90d and the boss 90c there is formed a relieved slot 106 defining a slightly flexible tensioning wall 90e of the member 90. Furthermore, angle flanges 90f are provided to strengthen the wall 90d. Thus it can be seen that when the set screws 104 are tightened, the tensioning walls 90e are forced inwardly to tightly hold the ball bushings 98 in position, and that each of the carriages 74 and 84 is provided with four ball bushings 98, two in engagement with each shaft 44.

Figure 10:
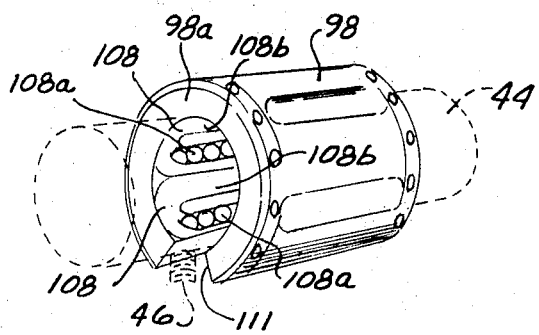
FIG. 10 is a greatly enlarged partly diagrammatic perspective view illustrating one of the ball bushings, and illustrating in dotted lines a portion of one of the support shafts and an adjusting and leveling bolt.

Having reference now to Fig. 10, it can be seen that each ball bushing 98 includes several oval shaped bearing races 108 each including two elongated parallel legs 108a and 108b. The legs 108a are open to the shaft 44 while the legs 108b are recessed in the body of the bearing. The races 108 extend between bushing end walls 98a and 98b, and the ball bearings contained in the legs 108a rollingly engage the corresponding shaft 44. In this manner it is assured that the copy holding assembly 26 and the lens mounting assembly 28 are able to easily slide back and forth along the shafts 44. Furthermore, the assemblies 26 and 28 are each supported by a four point support on the sturdy and level shafts 44 for very stable camera operation with low distortion.

In order to allow the carriages 74 and 84 to glide freely past the cross rails 34 where the shafts 44 are connected to the adjusting and leveling bolts 46, each boss 90c includes a slot 110 and each ball bushing 98 includes a slot 111, whereby the bolts 46 are able to pass through the ball bushings 98 and mounting bosses 90c.

Figure 5:
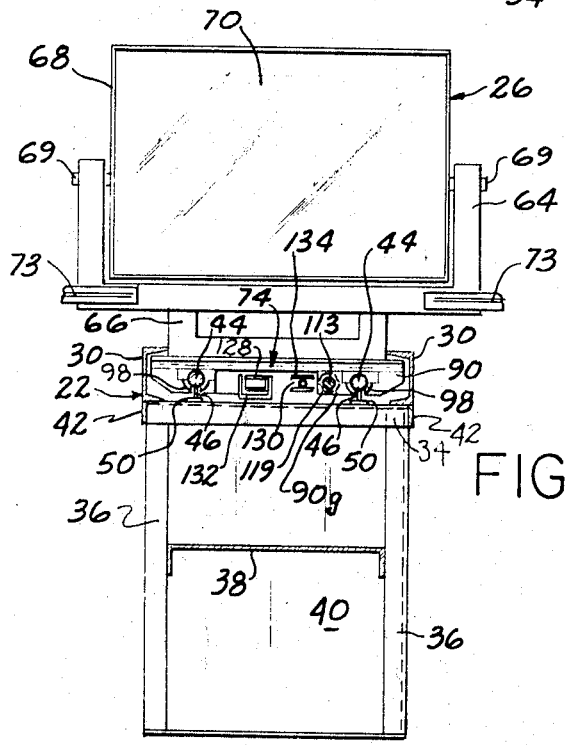
FIG. 5 is a sectional view taken along the line 5—5 of FIG. 2 illustrating the supporting bed and copy holding assembly.

Due to the use of the ball bushings 98 and the supporting shafts 44, the copy holding assembly 26 and the lens mounting assembly 28 can be adjusted with a very small force to desired positions. Adjustment of the lens mounting assembly 26 is accomplished by means of a lens carriage driving shaft 112 extending along the bed 22 and journaled for rotation in one of the end rails 32 at the end of the bed 22 and in a bearing support 114 (FIG. 3) mounted on one of the cross rails 34. The shaft 112 is threaded along its length and is in engagement with an internally threaded grommet 118 carried in a mounting boss 90g of the member 90 of the lens carriage 84 (FIG. 8). Similarly, adjustment of the copy holding assembly 26 is accomplished with a copy carriage driving shaft 113 mounted in a bearing support 116 at one end of the bed 22 and journaled in the end rail 32. The copy carriage driving shaft is engaged with another internally threaded grommet 119 in another mounting boss 90g of the copy carriage 74 (FIG. 5). The shafts 112 and 113 are rotated by means of a pair of hand wheels 120 and 122 conveniently located at the end of the supporting bed 22 immediately below the control panel 62. Rotation of these hand wheels causes the shafts 112 and 113 to rotate, thus causing movement of the lens carriage 84 and copy carriage 74.

In order that a camera operator located at the end of the horizontal camera adjacent the film holding assembly 24 is able to determine the positions of the lens and of the item to be copied, indicator means including a pair of transparent view plates 124 and 126 are provided on the control panel 62. The position of the lens is indicated by suitable markings upon a lens position tape 128 connected to the lens carriage 84 by suitable connecting members 130. The tape extends from one side of the lens carriage around a roller support 132, back under the lens carriage 84 to a roller (not shown) beneath the view plate 124 and back to the lens carriage 84. Similarly, the position of the item to be copied is indicated by means of markings on a copy position tape 134 connected to the copy carriage 74 by additional connectors 130 and extending from the copy carriage 74 around a roller support 136 (FIG. 2), back beneath the copy carriage 74 and around an additional roller (not shown) beneath the transparent plate 126 and back to the copy carriage 74. Thus, the camera operator located in a dark room may easily adjust the positions of the lens mounting assembly 28 and the copy holding assembly 26 by means of the hand wheels 120 and 122 by viewing the position indications beneath the plates 124 and 126.

In view of the preceding detailed description of the photographic machine 20, the operation of the machine will be apparent to those skilled in the art and will not be further described in detail.

While there has been shown and described a particular embodiment of the present invention, it will be apparent to those skilled in the art that various changes and modifications may be made without departing from the invention in its broader aspects, and it is therefore intended in the appended claims to cover all such changes and modifications as fall within the true spirit and scope of the invention.

What is claimed as new and desired to be secured by Letters Patent of the United States is:

1. Photographic apparatus for exposing film in accordance with an item to be copied, said apparatus comprising a rectangular bed including a plurality of spaced crosspieces spanning the short dimension of said bed, first and second parallel shafts mounted in a horizontal plane along the long dimension of said bed, a plurality of shaft adjusting means extending between said shafts and said crosspieces for leveling said shafts, a fixed camera portion including film holding means mounted at one end of said bed for holding film in a plane perpendicular to said shafts, first and second carriage members, first and second vertically extending frames mounted on said first and second carriage members in planes perpendicular to said shafts, lens means and copy holding means carried respectively by said first and second frames and parallel with said film, first and second pairs of ball bushings supported by each of said carriage members and engaging respectively said first and second shafts for four point sliding support of said carriage members on said shafts, said ball bushings each including a generally cylindrical body substantially encircling the corresponding shaft and a plurality of ball bearings rollingly engaged between said body and the shaft, and first and second drive screws extending from said one end of said bed and threadedly engaging respectively said first and second carriage members for adjusting the distances between said film holding means, lens means and copy holding means by sliding said carriage members along said shafts.

2. Photographic apparatus for exposing a film in accordance with an item to be copied, said apparatus comprising supporting means, parallel shafts mounted in a horizontal plane on said supporting means, a fixed camera portion including film holding means mounted on said supporting means for holding film in a plane perpendicular to said shafts, first and second carriage members, first and second vertically extending frames mounted on said first and second carriage members in planes perpendicular to said shafts, lens means and copy holding means carried respectively by said first and second frames and parallel with said film, and bushings supported by said carriage members and engaging said shafts for sliding movement of said carriage members along said shafts toward and away from said fixed camera portion, each said bushing including a generally cylindrical body substantially encircling the corresponding shaft and including a plurality of ball bearings rollingly engaged between said body and the shaft.

3. The apparatus of claim 2, said supporting means including a plurality of adjustment members engaging each of said shafts for leveling said shafts.

4. The apparatus of claim 3, said cylindrical bodies each including an axial slot permitting the bushings to slide past said adjustment members.

5. The apparatus of claim 2, further comprising a pair of rotatable threaded shafts each engageable with one of said carriage members for adjusting the distances between said fixed camera portion and said lens means and copy holding means.

6. The apparatus of claim 5, further comprising indicator means responsive to movement of said carriage members for indicating said distances.

References Cited

UNITED STATES PATENTS

| | | | |
|---|---|---|---|
| 1,846,972 | 2/1932 | Koppe | 88—24 |
| 2,402,107 | 6/1946 | Wekeman | 88—24 |
| 2,585,927 | 2/1952 | Gelb | 88—24 |

JOHN M. HORAN, *Primary Examiner.*

W. A. SIVERTSON, *Assistant Examiner.*

U.S. Cl. X.R.

355—18